(12) United States Patent
Choudhary et al.

(10) Patent No.: US 8,180,598 B2
(45) Date of Patent: May 15, 2012

(54) SYSTEM AND METHOD FOR PERFORMING THERMAL ANALYSIS ON A BUILDING THROUGH UNIVERSAL MESHING

(75) Inventors: Manoj K. Choudhary, Reynoldsburg, OH (US); Christopher P. Kasprzak, Holland, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 367 days.

(21) Appl. No.: 12/368,697

(22) Filed: Feb. 10, 2009

(65) Prior Publication Data

US 2010/0204962 A1    Aug. 12, 2010

(51) Int. Cl.
*G06F 17/50* (2006.01)
(52) U.S. Cl. ........ 703/1; 703/13; 52/786.13; 52/506.01; 52/172
(58) Field of Classification Search ...................... 52/834
See application file for complete search history.

(56) References Cited

U.S. PATENT DOCUMENTS

| | | | |
|---|---|---|---|
| 5,581,489 A | 12/1996 | Groothuis et al. | |
| 6,721,684 B1 | 4/2004 | Saebi | |
| 6,885,964 B2 | 4/2005 | Ogino et al. | |
| 6,985,832 B2 | 1/2006 | Saebi | |
| 7,127,380 B1 | 10/2006 | Iverson et al. | |
| 2003/0078758 A1 | 4/2003 | Hariya et al. | |
| 2007/0209317 A1* | 9/2007 | Jensen | 52/736.3 |

OTHER PUBLICATIONS

Ian Ross Doebber Investigation of Concrete Wall Systems for Reducing Heating and Cooling Requirements in Single Family Residences Master of Science in Mechanical Engineering Thesis, Virginia Polytechnic Institute and State University, Sep. 10, 2004.*
Curtis Pedersen, Daniel E. Fisher, Richard J. Liesen Development of Heat Balance Procedure for Calculating Cooling Loads ASHRAE Transactions: Symposia, 1997, vol. 103, Part 2.*
Choudhary, M.K., "A Study of Heat Transfer and Fluid Flow In the Electroslag Refining Process", 1980, 281 pgs.

* cited by examiner

*Primary Examiner* — Kamini S Shah
*Assistant Examiner* — Cuong Luu
(74) *Attorney, Agent, or Firm* — Calfee, Halter & Griswold, LLP

(57) ABSTRACT

A universal mesh for a building insulation model is established from a template representing a wide range of insulation profiles, with the mesh being used for conducting one, two or three-dimensional finite element analysis (FEA) regarding thermal insulation factors for the building. The system and method take into account a wide range of heat related factors, including structural materials of the building, insulation components encompassing both insulation materials employed in the building process and established air pockets or gaps, and even fasteners used in the construction process.

21 Claims, 4 Drawing Sheets

US 8,180,598 B2

SYSTEM AND METHOD FOR PERFORMING THERMAL ANALYSIS ON A BUILDING THROUGH UNIVERSAL MESHING

TECHNICAL FIELD AND INDUSTRIAL APPLICABILITY OF THE INVENTION

The present invention pertains to the art of finite element analysis and, more particularly, to modeling and analyzing insulation parameters for buildings using finite element analysis.

BACKGROUND OF THE INVENTION

Finite element analysis (FEA) is a computer simulation technique used in engineering analysis, most particularly, a methodology for numerical solutions of engineering problems involving differential equations. In general, FEA consists of modeling an object as a collection of elements and analyzing the model to determine information regarding the effects of heat transfer, mechanical stress, thermal stress and the like on the object. In a pre-processing stage, a geometric model is developed of a structure to be analyzed. The model essentially takes into account main structural parameters considered to be important for the actual component. Once the geometric model has been created, a meshing procedure is employed to define and break up the model into small volume or finite elements. Structural properties are then associated with each finite element for analysis purposes.

One common application of this process concerns designing and analyzing interconnected components which are to be subjected to considerable stress and/or strain, such as in the automotive industry. In many instances, a computer aided design or CAD program is employed for the purpose of establishing desired geometric models for the various components. Once a desired design is established and solid modeling has been performed, the models are meshed or broken down for finite element analysis. The overall finite model is therefore defined by a mesh network having nodes or points associated with the model at which various individual element analyses are performed. The collective analyzes establish a system of equations which can be solved for unknown values to approximate desired characteristics or parameters of the components.

FEA is now becoming more common in a wide range of fields. Therefore, instead of being limited to determining stress, strain, and displacement factors in mechanical components, FEA is now used in connection with modeling in various fields, including heat transfer, fluid dynamics and electromagnetism. For example, U.S. Pat. No. 6,885,964 is concerned with utilizing FEA in the thermal analysis of targeted regions of a component, such as a piston of an internal combustion engine. Of particular interest to the present invention is the use of FEA in building analysis and, more particularly, building insulation analysis. In connection with building analysis in general, it has been heretofore proposed to create a composite building from various components, create meshes of various sections of the building and perform finite element analysis thereon to determine strength parameters for the resulting building, such as represented by U.S. Pat. Nos. 6,721,684 and 6,985,832. One major problem with such known arrangements is that the resulting data is very case specific and the altering of one element or region requires the entire modeling and analysis to be repeated. Therefore, advantages would exist in establishing a more universal meshing arrangement for performing FEA in connection with a building. In addition, although finite element analysis has been used in the building industry, significant advantages would be obtained in providing a universal meshing arrangement for performing finite element analysis in connection with thermal insulation properties of a building, particular a comprehensive thermal building component analysis. Therefore, a system and method of generating a universal computational mesh for building heat transfer analysis would be extremely beneficial.

SUMMARY OF THE INVENTION

The present invention is directed to generating a building insulation model with a universal mesh from a template representing the entire range of potential insulation profiles, with the mesh being used for conducting one, two or three-dimensional finite element analysis (FEA). The system and method take into account a wide range of heat related factors, including structural materials of the building, insulation components encompassing both insulation materials employed in the building process and established air pockets or gaps, and even fasteners used in the construction process. Pre-established layers in the universal mesh which do not directly correspond to existing insulation components are automatically assigned a very high thermal conductivity value so as to be negligible in the overall insulation analysis. The overall system significantly reduces the time, effort and expense required for creating a computational mesh for modeling heat transfer in building insulation assemblies, particularly metal buildings. Further, the system offers flexibility in meshing arbitrary insulation thickness profiles to accommodate different types of insulation, multiple layers of insulation and different modes of installing the insulation. Additionally, the system offers flexibility for meshing assemblies having air gaps between insulation layers and interior roof or wall surfaces.

Additional objects, features and advantages of the present invention will become more readily apparent from the following detailed description of preferred embodiments when taken in conjunction with the drawings wherein like reference numerals refer to corresponding parts in the several views.

DETAILED DESCRIPTION OF THE PREFERRED EMBODIMENTS

Figure 1:
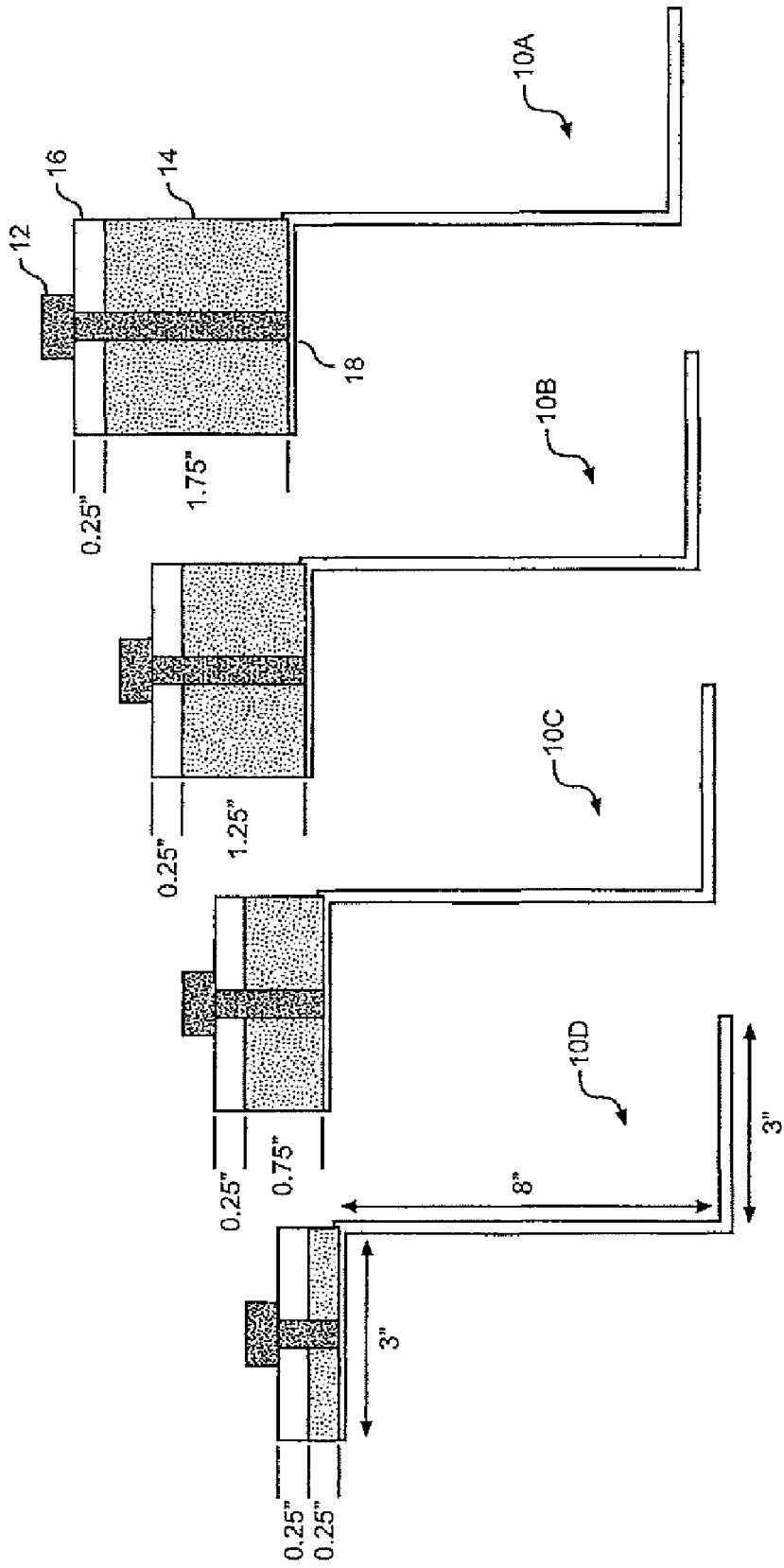
FIG. 1 illustrates base frame configurations for analyzing various building insulation configurations.

With initial reference to FIG. 1, base frames 10a-10d represent plural base frame configurations of a building. This figure is basically presented to illustrate that base frames 10a-10d represent a fair range in material and thermal properties. In general, after the particular building structure of the invention has been meshed, the meshed finite elements are used to conduct a FEA of the structure, employing one of several commercially available FEA processors which utilize the mesh area elements of the modeled object to analyze the effect of boundary value field equations. At this point, it should be realized that finite element analysis is used herein to cover various known finite analysis techniques, including finite element and finite difference techniques. Once the analysis is conducted, the results may then be studied to identify implications of the particular construction. Although this figure separately illustrates different potential building construction models, the present invention is actually concerned with establishing a universal meshing system that can be used with any particular model configuration. At this point, it is only important to note that the system and method of the invention are designed to take into account the material and thermal properties across a wide range of building insulation configurations, while taking into account the thermal effects for fasteners 12, insulation 14, any air gaps 16 present for each base frame configuration and purlins 18.

Figure 2:
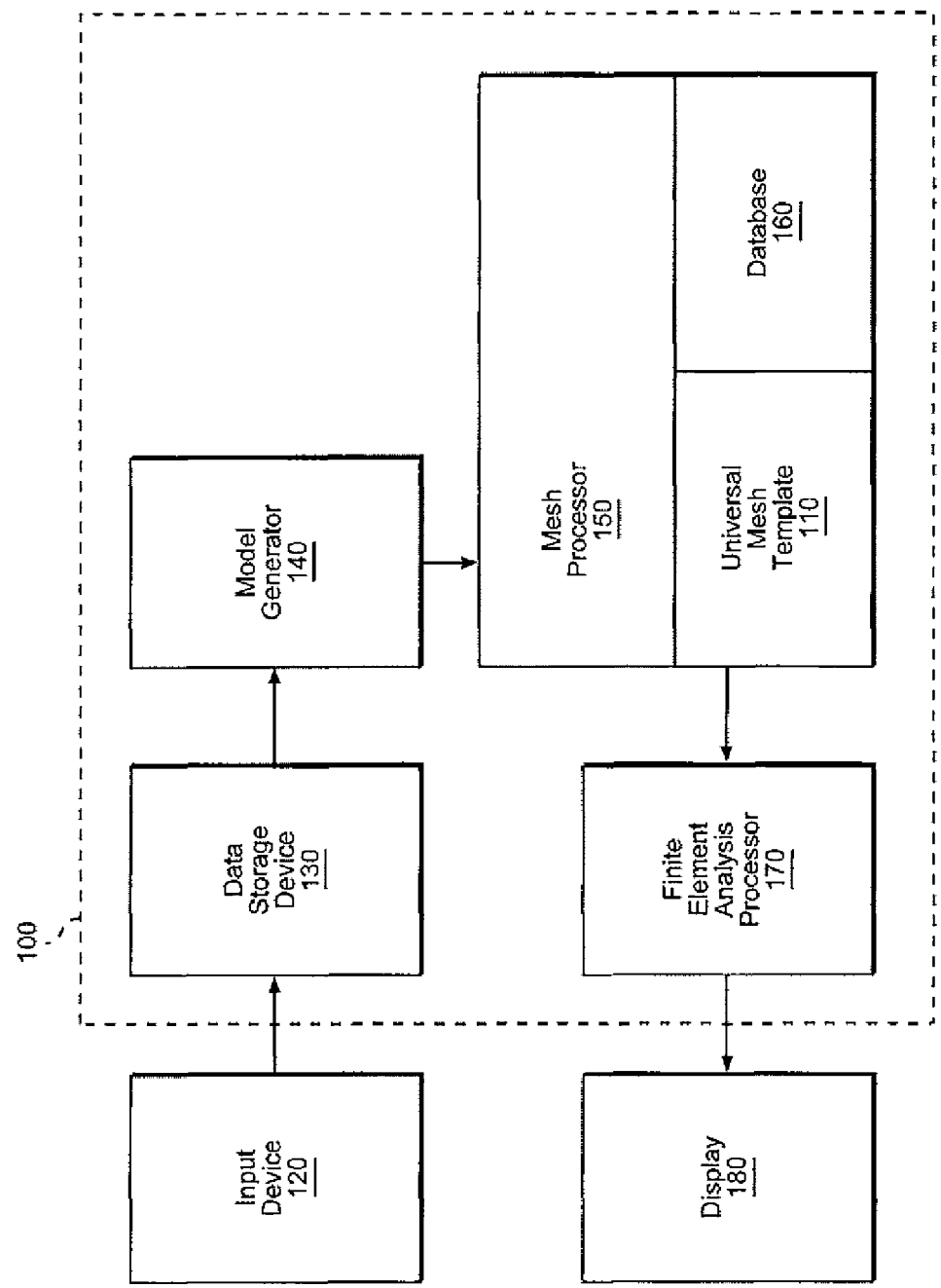
FIG. 2 illustrates a block diagram of a computer system utilizing a base frame of the present invention.

FIG. 2 presents a block diagram of a computer system 100 for performing thermal analysis of a building utilizing a universal mesh template 110 in accordance with the present invention. In general, computer system 100 includes an input device 120 in communication with a data storage device 130. Data storage device 130 is in communicating with a model generator 140 which, in turn, is in communication with a mesh processor 150 containing universal mesh template 110. Optionally, mesh processor 150 can be provided with a database 160. Output generated by mesh processor 150 is sent to a finite element analysis (FEA) processor 170 for analysis. A display 180 is provided to present results of the FEA analysis to a user.

Figure 3:
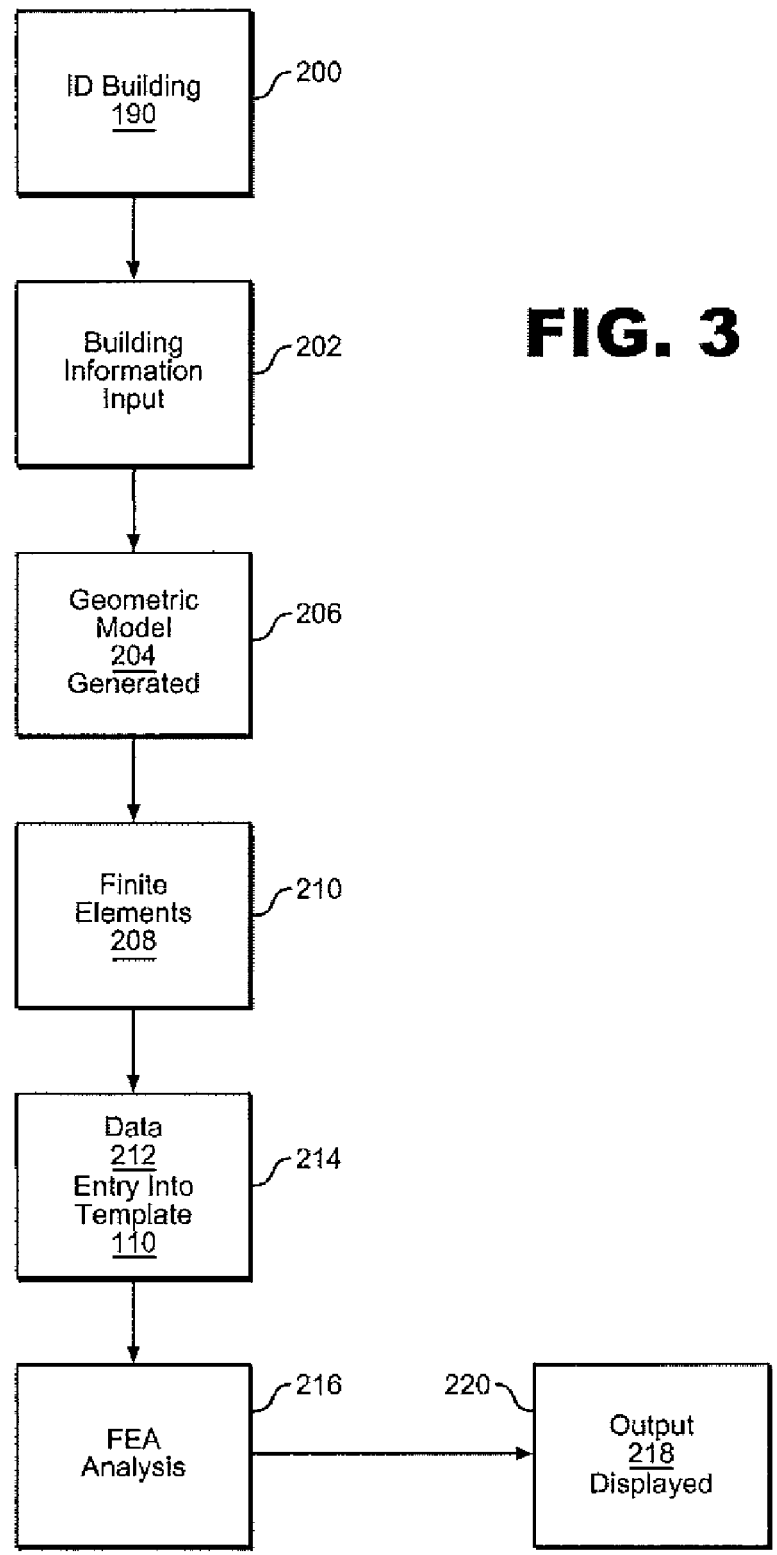
FIG. 3 represents an overview of the finite element analysis procedure of the present invention.

In operation, computer system 100 analyzes the effects of heat transfer and thermal mechanical stress on a metal building to be modeled in accordance with the flow chart of FIG. 3. When utilizing a commercially available FEA software package, input of a topological description of the geometric features of a building is required. This can be in either one-dimensional, two-dimensional or three dimensional form (1D, 2D or 3D). Initially, a building of interest 190 is selected for analysis at step 200. Input device 120 is then utilized to enter information into data storage device 130 at step 202, thereby quantifying the geometry, materials and boundary conditions of building 190 in order to generate a geometric model 204 at step 206 utilizing model generator 140. Alternatively, model generator 140 need not be utilized or even present in system 100 if a geometric model 204 of building 190 already exists. Regardless, geometric model 204 is parsed into representative units or finite elements 208 at step 210 utilizing model generator 140. Thermal conductivity data 212, corresponding to particular physical elements of each finite element 208, is then entered into universal mesh template 110 at step 214 utilizing mesh processor 150. Thermal conductivity data 212 is provided by data storage device 130 or mesh processor database 160. Template 110 may also contain sub-domains that do not exist physically. For example, a sub-domain can be represented by a very large or 'infinite' value of conductivity K to render the resistance to heat flow negligible, i.e., approaches zero, as will be more fully discussed below. Next, FEA processor 170 performs a data analysis at step 216. At this point, output 218 generated by data analyses step 216 which is sent to display 180 at step 220. Known numeric and graphical tools may then be utilized to view and fully identify implications of output 218 through display 180.

Figure 4:
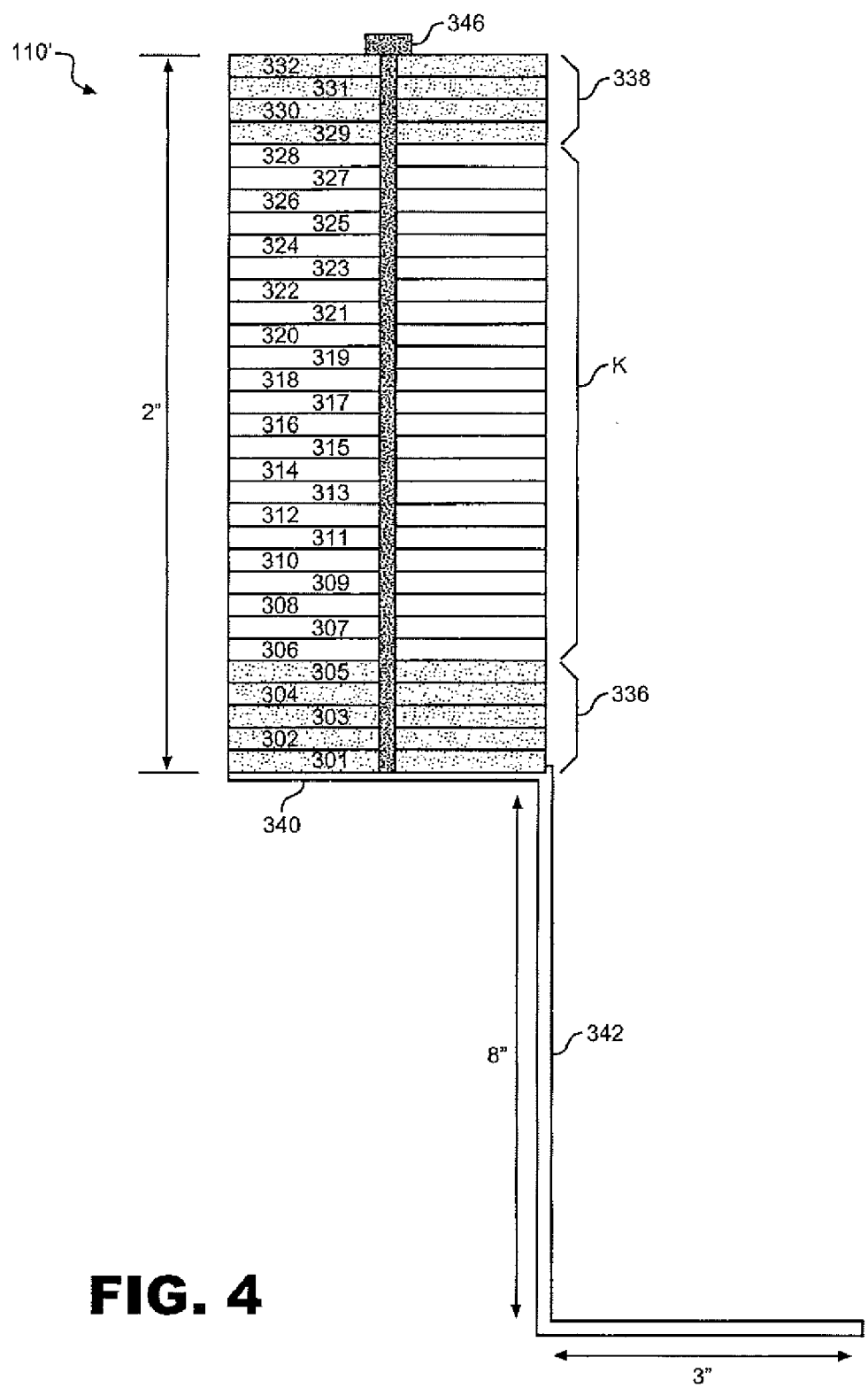
FIG. 4 illustrates a universal base frame employed in connection with the present invention.

Universal mesh template 110 of the present invention will now be detailed with reference to FIG. 4. A particular universal mesh template 110' comprises a plurality of layers 301-332, each representing a predetermined insulation thickness, such as a thickness of approximately $\frac{1}{16}$ inch (approximately 16 millimeters). In accordance with the preferred embodiment of the present invention, universal mesh template 110' includes thirty-two layers. Thermal conductivity data 212 corresponding to the particular physical components and attributes of finite element 208 are associated with layers 301-332 during step 214. In the example shown, a finite element 208 includes a layer of insulation 336, such as fiberglass or other known insulation materials, represented by layers 301-305, a flute air gap 338 represented by layers 329-332, a purlin represented at 340, a wall surface represented at 342 and a fastener represented at 346. In some cases, a particular finite element 208 will not contain sufficient physical elements to fill each layer of the template 110. For example, template 110' depicts a 2 inch (approximately 5 cm) space between purlin 340 and the bottom of the fastener head 346 whereas, in reality, there may only be a 1 inch (approximately 2.5 cm) space defined by insulation 336 and air gap 338. In such cases, a very large thermal conductivity number K is associated with the empty layers 306-328. As K approaches infinity, the resistance to heat flow calculated by FEA processor 170 approaches zero and the effect of empty layers 306-328 is negligible.

With this configuration, mesh template 110 already incorporates numerous layers which can be assigned different insulating values based on the materials employed, while also addressing the insulating value of air layers, as well as the fasteners employed in the construction process, The materials employed and the manner of construction will affect the values corresponding to the elements associated with each layer. With the ability to essentially reduce to zero the effect of empty layers, a universal meshing arrangement is established. Therefore, it should be readily apparent that the system and method of the present invention can be readily utilized to provide a solution of heat transfer and/or flow for buildings based on differing insulation profiles. The method generates a universal mesh from a template representing the entire range of the potential insulation profiles. This mesh is then used for conducting one, two or three-dimensional finite element analysis (FEA). Of particular significance, the universal mesh may be used for a wide variety of insulation profiles without having to regenerate a new mesh for each profile. In addition, the system and method take into account a wide range of heat related factors, including structural materials of the building, insulation components encompassing insulation materials specifically employed in the building process, established air pockets or gaps, and even fasteners used in the construction process. In this manner, the overall system of the invention significantly reduces the time, effort and expense required for creating a computational mesh for modeling heat transfer in building insulation assemblies, including insulation assemblies for metal buildings. Further, the system offers flexibility in meshing arbitrary insulation thickness profiles to accommodate different types of insulation, multiple layers of insulation and different modes of installing the insulation. Additionally, the present system offers flexibility for meshing assemblies having air gaps between insulation layers, or between insulation and other building components, such as an interior roof or wall surface.

Although described with reference to preferred embodiments of the invention, it should be readily understood that various changes and/or modifications can be made to the invention without departing from the spirit thereof. In general, the invention is only intended to be limited by the scope of the following claims.

What is claimed is:

1. A system for performing thermal analysis of a building comprising:
   a universal mesh template that permits thermal analysis of a plurality of different configurations of building elements, said universal mesh template having pre-established layers representing the entire range of potential insulation profiles, with each of the pre-established layers representing a building element, wherein each of said pre-established layers are assignable with either a value that represents an insulation property of a building element present in the building being analyzed or a value that indicates that the pre-established layer does not directly correspond to an existing insulation component of the building and is not needed for thermal analysis of the building being analyzed;

an input device for assigning values to said pre-established layers;

a finite analysis processor for analyzing the universal mesh template to generate thermal characteristics for the building being analyzed.

2. The system according to claim 1, further comprising:
means for entering geometric data on the building;
a model generator for generating a geometric model of the building based on the geometric data; and
means for dividing the geometric model into a plurality of finite elements.

3. The system according to claim 1, wherein the input device is configured to permit a user to insert a thermal conductivity value in each of the pre-established layers which are not assigned a thermal conductivity data.

4. The system according to claim 1, wherein the input device is configured to permit a user to enter a thermal conductivity value characteristic for a fastener.

5. The system according to claim 1, wherein the input device is configured to permit a user to enter a thermal conductivity value characteristic for air.

6. The system according to claim 1, wherein the input device is configured to permit a user to enter a thermal conductivity value characteristic for fiberglass insulation.

7. The system according to claim 1, wherein the input device is configured to permit a user to enter a thermal conductivity value characteristic for each of a purlin, an insulation material, a roof surface, a wall surface, a fastener and air.

8. A method of performing thermal analysis of a building comprising:
creating a model for a building, made from a plurality of building elements, to be analyzed;
dividing the model into a plurality of finite elements associated with the plurality of building elements;
providing a universal mesh template including a plurality of layers representing the entire range of potential insulation profiles, wherein the universal mesh template permits thermal analysis of a plurality of different configurations of the building elements;
inserting a thermal conductivity value, characteristic of a respective one of the plurality of building elements, into a number of the plurality of layers of the universal mesh template, with the number of the plurality of layers depending on an amount of the one of the plurality of building elements relative to other ones of the plurality of building elements;
establishing an insulating value in each of the plurality of layers that do not have an existing building element associated therewith and is not needed for thermal analysis of the building being analyzed; and
performing finite analysis on the model for the building.

9. The method of claim 8, wherein establishing an insulating value constitutes inserting a thermal conductivity value in each of the plurality of layers that do not have an existing building element associated therewith.

10. The method of claim 9, wherein inserting a thermal conductivity value constitutes entering a thermal conductivity value characteristic of a respective one of the plurality of building elements which is selected from the group consisting of a purlin, an insulation material, a roof surface, a wall surface, a fastener and air.

11. The method of claim 10, wherein inserting a thermal conductivity value constitutes entering a thermal conductivity value characteristic for a fastener.

12. The method of claim 10, wherein inserting a thermal conductivity value constitutes entering a thermal conductivity value characteristic for air.

13. The method of claim 10, wherein inserting a thermal conductivity value constitutes entering a thermal conductivity value characteristic for fiberglass insulation.

14. The method of claim 10, wherein inserting a thermal conductivity value constitutes entering a thermal conductivity value characteristic for each of a purlin, an insulation material, a roof surface, a wall surface, a fastener and air.

15. The system of claim 3, wherein a thermal conductivity value is entered in each of the pre-established layers not needed for thermal analysis of the building being analyzed that causes the insulating value to approach zero.

16. The method of claim 9, wherein a thermal conductivity value is entered in each of the plurality of layers that do not have an existing building element associated therewith that causes the insulating value to approach zero.

17. The system of claim 1 comprising an output device for presenting results computed by the finite analysis processor.

18. The system of claim 1, wherein the finite analysis processor utilizes finite element techniques to analyze the universal mesh template.

19. The system of claim 1, wherein the finite analysis processor utilizes finite difference techniques to analyze the universal mesh template.

20. The method of claim 8, wherein performing finite analysis on the model for the building utilizes finite element techniques.

21. The method of claim 8, wherein performing finite analysis on the model for the building utilizes finite difference techniques.

* * * * *